United States Patent [19]

Hardin, Jr.

[11] Patent Number: 5,597,178
[45] Date of Patent: Jan. 28, 1997

[54] SEATBELT AIRBAG

[76] Inventor: Paul W. Hardin, Jr., 3086 Park La., Snellville, Ga. 30278

[21] Appl. No.: 292,411

[22] Filed: Aug. 18, 1994

[51] Int. Cl.⁶ .................................................. B60R 21/18
[52] U.S. Cl. ............................................................ 280/733
[58] Field of Search ........................... 280/733, 730 R, 280/730 A, 728 B, 728 R, 801.1, 808, 730.1, 730.2, 728.3, 728.1

[56] References Cited

U.S. PATENT DOCUMENTS

| | | | |
|---|---|---|---|
| 3,430,979 | 3/1969 | Terry et al. | 280/733 |
| 3,706,463 | 12/1972 | Lipkin | 280/733 |
| 3,791,670 | 2/1974 | Lucore et al. | 280/733 |
| 3,971,569 | 7/1976 | Abe et al. | 280/733 |
| 4,348,037 | 9/1982 | Law et al. | 280/733 |
| 4,971,354 | 11/1990 | Kim | 280/733 |
| 5,062,662 | 11/1991 | Cameron | 280/733 |
| 5,161,821 | 11/1992 | Curtis | 280/733 |
| 5,242,193 | 9/1993 | Humpal | 280/733 |
| 5,275,433 | 1/1994 | Klober et al. | |
| 5,288,104 | 2/1994 | Chen | 280/733 |
| 5,324,075 | 6/1994 | Sampson . | |

FOREIGN PATENT DOCUMENTS

| | | | |
|---|---|---|---|
| 4110252 | 4/1992 | Japan | 280/730 R |
| 8807947 | 10/1988 | WIPO | 280/733 |

*Primary Examiner*—Brian L. Johnson
*Assistant Examiner*—Peter C. English
*Attorney, Agent, or Firm*—Webb Ziesenheim Bruening Logsdon Orkin & Hanson, P.C.

[57] ABSTRACT

A vehicular restraint system in which the airbag and the seatbelt structures are combined. The airbag is located in a pouch and either the lap or shoulder belt of the restraint assembly is threaded through the pouch together with a gas flow channel which is connected to the airbag within the pouch from a source of gas for inflating the airbag. Upon sensor indication of vehicle impact, the source of gas releases the gas through the gas flow channel into the airbag which is inflated in place. When the airbag is positioned on the vehicle occupant's lap, the airbag inflates upwardly from the lap position and when the airbag is positioned on the shoulder belt, the airbag inflates in both a downward and an upward direction.

4 Claims, 5 Drawing Sheets

5,597,178

SEATBELT AIRBAG

FIELD OF THE INVENTION

The present invention is a restraint system for automobiles and other passenger vehicles, in which the airbag inflates from the passenger seatbelt instead of from vehicle cabin surfaces or structures.

BACKGROUND OF THE INVENTION

If any two improvements have dramatically improved vehicular safety for vehicle occupants, those two improvements are the seatbelt and the airbag. As provision and use of these two important safety devices has increased, automotive and vehicular safety has improved dramatically. At the same time, both of these safety devices have disadvantages—with the airbag's faults being the most serious of the two.

Traditional airbags are detonated by crash sensors, and sudden airbag inflation is caused by gas generation—typically sodium azide, sodium hydroxide or carbon dioxide gas delivered from strategically positioned canisters. Thus the traditional airbag propels toward the driver or the passenger, on the wave of an exploding gas, and immobilizes the driver or passenger for a brief period. Although the potential contusion and noise/ear damage risks are appreciated in a general way by the public, usually only health care providers see the serious injury airbag deployment can cause. And while relatively lesser injury is certainly preferable to life-threatening injury or death, any injuries caused by so-called "safety" devices should be avoided if at all possible.

For example, clinicians have documented instances in which a driver or passenger smoking a pipe has been impaled through the back of the throat with the pipe stem upon airbag inflation. Similar injuries are sustained by passengers who may be eating or working while riding—any pens, pencils or dining implements (even plastic ones) in the vicinity of the head pose injury risks, especially considering the widespread unconscious habit of chewing on the end of a writing implement. An even greater injury risk is the wearing of ordinary eyeglasses: the surgical removal of eyeglasses embedded around a driver's or passenger's eyes after airbag inflation is already documented in the medical literature, and clearly head injuries of this kind should be avoided if there is any way to do so.

A further disadvantage with traditional airbags has to do with their directionality. A typical, steering-column driver's side airbag can protect a driver from a head-on vehicular impact, but offers little or no protection in a side collision, particularly to the driver's left. Likewise, a passenger-side airbag offers little or no protection to the passenger's right side. Automobile manufacturers are at this writing beginning to introduce side airbags in an effort to address this problem, but the costs involved in this approach are prohibitive. For one thing, side airbags do not replace front airbags and the provision of both therefore at least doubles the cost of providing a single airbag. Also, door designs have not to date lent themselves to airbag incorporation, so that side air bags have required door redesigns which increase costs even further.

Even seatbelts are known to have been plagued with unique problems. A traditional seatbelt can cause its own contusion depending on the force of impact, and while most of these contusions lead only to bruises, more serious damage has also occurred. It is known from the literature to provide for localized inflation to a seat belt, upon vehicle impact, to provide a cushion between the belt and the individual wearing it, but this design has not been widely adopted. A goal of improved vehicular restraint technology thus includes the elimination of seatbelt contusions resulting from vehicle impact.

In view of all of the above, a need remains for a vehicular restraint system in which the benefits of seatbelts and airbags are preserved but the injury caused by the impact of the seatbelt and/or the airbag is minimized or avoided.

SUMMARY OF THE INVENTION

The present invention is a vehicular restraint in which the airbag and the seatbelt structures are combined. In the preferred embodiment of the invention, the airbag is packed into a pouch and either the lap or shoulder belt of the seatbelt assembly is threaded through the pouch together with gas flow means. The gas flow means connect the airbag within the pouch to the source of gas for inflation, which in one preferred embodiment is remotely positioned within the adjacent seat assembly. Upon sensor indication of crash or impact, the remote source of gas releases the gas through the gas flow means and into the airbag, which inflates in place, bursting out of its pouch in so doing. If the airbag pouch is positioned on the vehicle occupant's lap, the airbag inflates up from the lap position. If the airbag pouch is positioned on the shoulder belt, the airbag inflates in both the upward and downward directions. Particular design of the pouch according to the preferred embodiments ensures that the direction of inflation and deployment will protect both the front and one side of the vehicle occupant, and the airbag design itself also contributes to this front-and-side protection. Mirror image designs as compared with the designs disclosed herein may be used in cars designed for left-of-road driving outside the United States.

Vehicle airbags and gas generating means therefor are generally already documented in the general and patented literature. For example, U.S. Pat. No. 5,275,433 to Klober et al., entitled "Gas Generator for an Airbag," which is hereby incorporated herein by reference, discloses a gas generator for an airbag and as well as various aspects of prior art airbag designs. U.S. Pat. No. 5,324,075 to Sampson, also incorporated herein by reference, is entitled "Gas Generator for Vehicle Occupant Restraint," with the restraint being the airbag itself and the gas generator being a housing containing gas generating material positioned apart from the airbag. For example, the Sampson patent is exemplary of the above-summarized creating of inflatable seat belts (see column 2, line 38 of the patent) intended to reduce seatbelt inflicted contusions. These and other issued patents establish that airbag manufacture and deployment, as well as the gas generation means used in conjunction therewith, are already known and their fabrication and use is within the skill of the art. Crash sensors (in the periphery of the vehicle) and igniters for the gas generating means are also well-known in the art, as well as the necessary communications systems therebetween.

The present invention is an improvement over the state of the art in that the present airbag is placed within a pouch (or the airbag is the pouch) which literally rides on a lap or shoulder seatbelt adjacent the vehicle occupant. The airbag pouch is provided with gas flow means to carry generated gas from the gas generating means to the airbag. One example of such a design is a gas generation canister located in the adjacent vehicle seat assembly, with soft polymer conduit connecting the canister and the airbag. The conduit can run alongside—preferably underneath and associated with—the seatbelt, and this design is described further below.

In the preferred embodiments of the invention, the pouch on the seatbelt is designed so as to deploy the airbag both to the front and to one side of the vehicle occupant. In United States cars, the driver's airbag should deploy to the front and to the left of the driver; the front right passenger's airbag should deploy to the front and to the right of that passenger, and so on. Cars designed for left-of-road driving will observe the opposite conventions. Airbags of this type can be provided for each seatbelt assembly, with at least six airbags per average car being typical.

Also preferably, the present seatbelt airbags are preferentially included in "passive restraint" type seat belt designs in which the seatbelt automatically positions over the vehicle occupant as the vehicle door closes. As will become more apparent from the following description, the present seatbelt airbag inflates upon vehicle impact directly in front of the driver or passenger wearing the seatbelt. It is easy to see that if a vehicle occupant were to sit on a seatbelt bearing the present airbag, instead of wearing the seatbelt properly, an inflating airbag during a crash situation would offer no impact protection and might exacerbate the occupant's forward acceleration.

In summary, the present invention is a vehicular restraint system in which the airbag and the seatbelt structures are combined. In the preferred embodiment of the invention, the airbag is packed into a pouch and either the lap or shoulder belt of the seatbelt assembly is threaded through the pouch together with gas flow means. The gas flow means connect the airbag within the pouch to a remote source of gas for inflation, which in the preferred embodiment is positioned within the adjacent seat assembly. Upon sensor indication of crash or impact, the remote source of gas releases the gas through the gas flow means and into the airbag, which inflates in place. If the airbag pouch is positioned on the vehicle occupant's lap, the airbag inflates up from the lap position. If the airbag pouch is positioned on the shoulder belt, the airbag inflates in both a downward and an upward direction. Particular design of the pouch ensures that the direction of inflation and deployment will protect both the front and one side of the vehicle occupant, and special designs for the driver seatbelt airbag ensure that the airbag does not become entangled with the steering column and/or steering wheel.

A complete understanding of the invention will be obtained from the following description when taken in connection with the accompanying drawing figures wherein like reference numerals identify like parts throughout.

DESCRIPTION OF THE PREFERRED EMBODIMENTS

Figure 1:
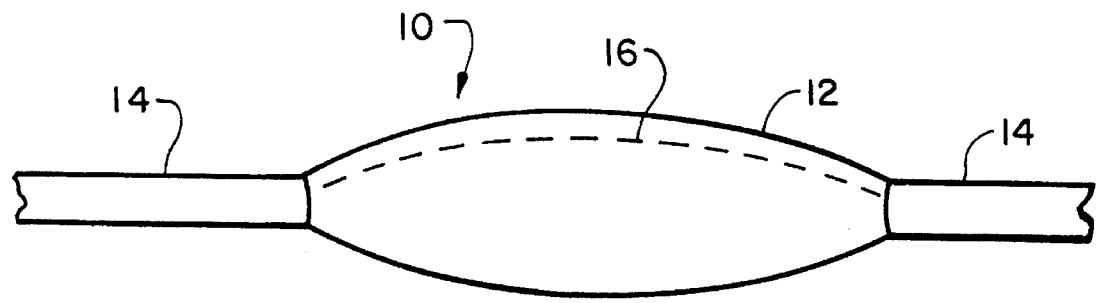
FIG. 1 is a plan view of a seatbelt airbag according to the present invention.

Referring now to FIG. 1 of the drawings, the seatbelt airbag 10 is shown in plan view, i.e., facing the wearer, with the seatbelt 14 threaded through the airbag pouch 12. The airbag pouch 12 is a protective covering for an actual airbag contained therein in a deflated, folded configuration (not shown). The airbag pouch may be made of virtually any material suitable for fabricating pouches as long as the material has enough softness or pliability to be tolerated when strapped adjacent to a vehicle occupant. Most often, the pouch is fabricated of the same vinyl material as is used in the vehicle interior. Preferably, the pouch has a weak area or break line 16 in the position as illustrated, so as to encourage airbag deployment in the correct direction. In other words, the airbag inside the airbag pouch 12 will inflate upwardly and toward the wearer, due to the position of the weak area 16.

Figure 2:
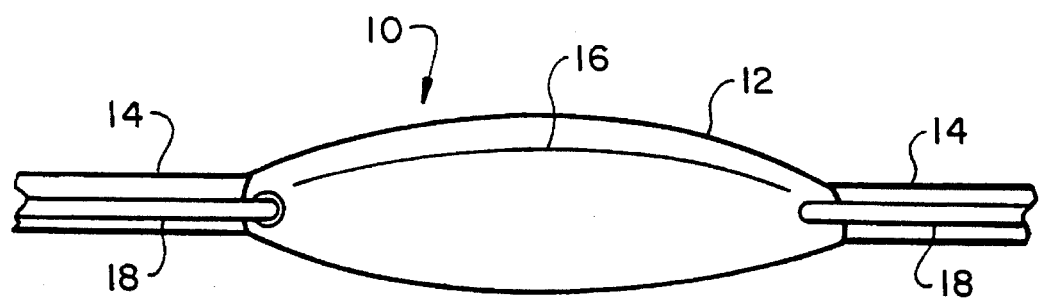
FIG. 2 is a reverse view of the seatbelt airbag shown in FIG. 1.

In FIG. 2 of the drawings, the seatbelt airbag 10 is shown from the side of the wearer. The weak area 16 faces the wearer near the top of the airbag pouch 12. FIG. 2 also illustrates gas flow means 18 which are colinear with the seatbelt 14. Preferably, the gas flow means 18 are gas channels made of soft, flat polymer tubing or conduit. Such soft polymer tubing is adequately strong to convey generated gas under pressure, to deploy the airbag, but is soft and pliable enough to coincide with the seatbelt without causing a vehicle occupant discomfort or inconvenience.

Figure 3:
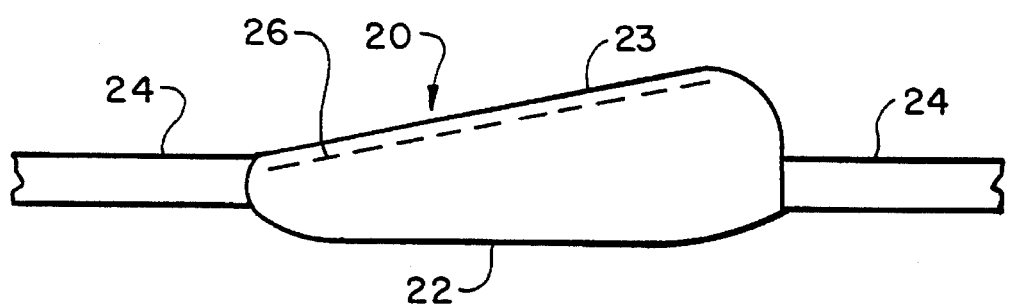
FIG. 3 is a plan view of another embodiment of the seatbelt airbag according to the present invention.
Figure 4:
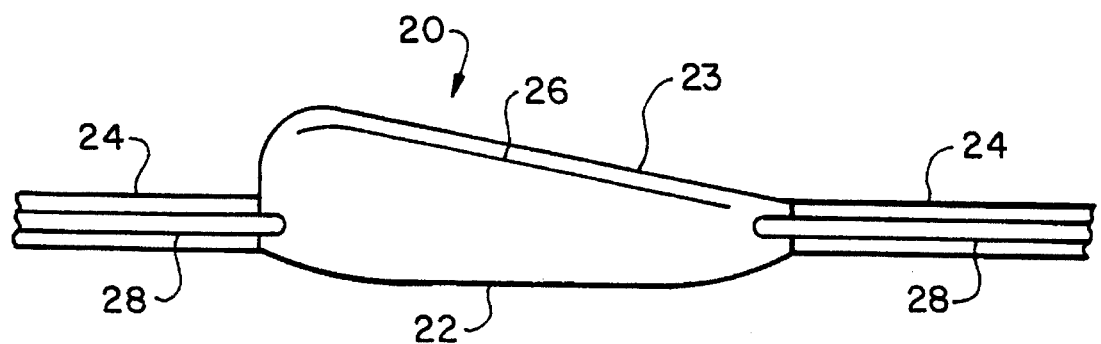
FIG. 4 is a reverse view of the seatbelt airbag shown in FIG. 3.

FIG. 3 of the drawings is a plan view of an embodiment of the invention in which the seatbelt airbag 20 includes an airbag pouch 22 having an inclined surface 23 thereon. The airbag pouch 22 rides on the seatbelt 24 in the same manner as illustrated in FIGS. 1 and 2. The inclined surface 23 of the airbag pouch 22 enhances the ability of the airbag to deploy upwardly and to the right of the wearer. The seatbelt airbag 20 of FIG. 3 is viewed from in front of the wearer and is intended for use by the front right passenger of a made-for-United States-use vehicle. FIG. 4 shows the reverse view of the seatbelt airbag 20 of FIG. 3, and illustrates the weak area or break line 26 and gas flow means 28.

In the above description, "weak area" or "break line" literally means an area as illustrated of the respective airbag pouch which does not have the same tensile or elongation strength as the rest of the airbag pouch. The weak area is thus the area through which the contained airbag is certain to deploy upon inflation, as the weak area offers the path of least resistance. The weak area may be a score or perforation in the airbag pouch, or may simply be an area where the gauge of the pouch material is relatively thinner. Those skilled in the art will easily be able to derive variations on the theme of weakening an area of the airbag pouch to direct airbag deployment.

Figure 5:
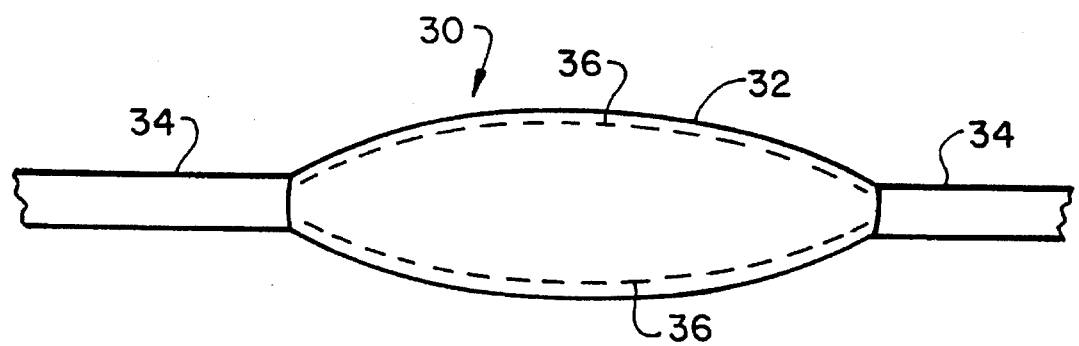
FIG. 5 is a plan view of another embodiment of the invention intended for use with a shoulder seatbelt.
Figure 6:
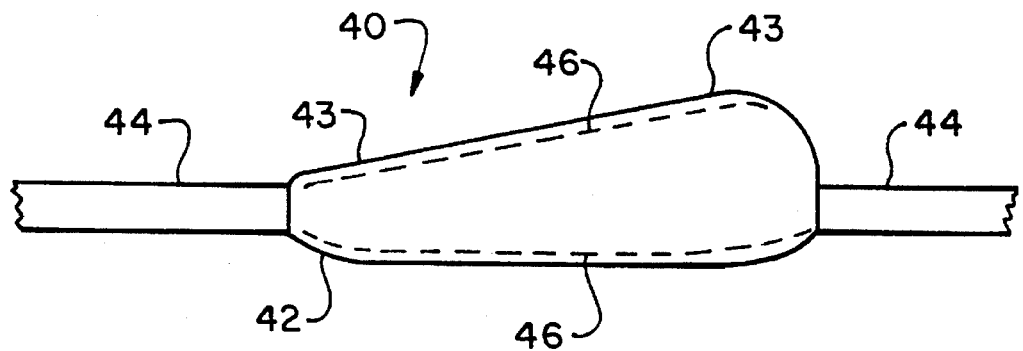
FIG. 6 is a plan view of yet another embodiment of the invention intended for use with a shoulder seatbelt.

FIGS. 1–4 illustrate airbag pouches for use with lap seatbelts. Accordingly, the weak areas are positioned near the top and on the occupant side of the airbag pouch. FIGS. 5 and 6 illustrate top and bottom weak areas on the pouch intended for positioning on a shoulder seatbelt, so that the airbag will deploy both upwardly toward the occupant's head, as well as downwardly toward the lap. FIG. 5 is a plan view of a seatbelt airbag 30 in which the seatbelt 34 passes through an airbag pouch 32 having weak areas 36 thereon. FIG. 6 is a plan view of a seatbelt airbag 40 in which an airbag pouch 42 has a seatbelt 44 threaded therethrough, with dual weak areas 46. Airbag pouch 42 has an inclined surface 43 thereon, to encourage airbag deployment preferentially toward one side of the wearer.

Figure 7:
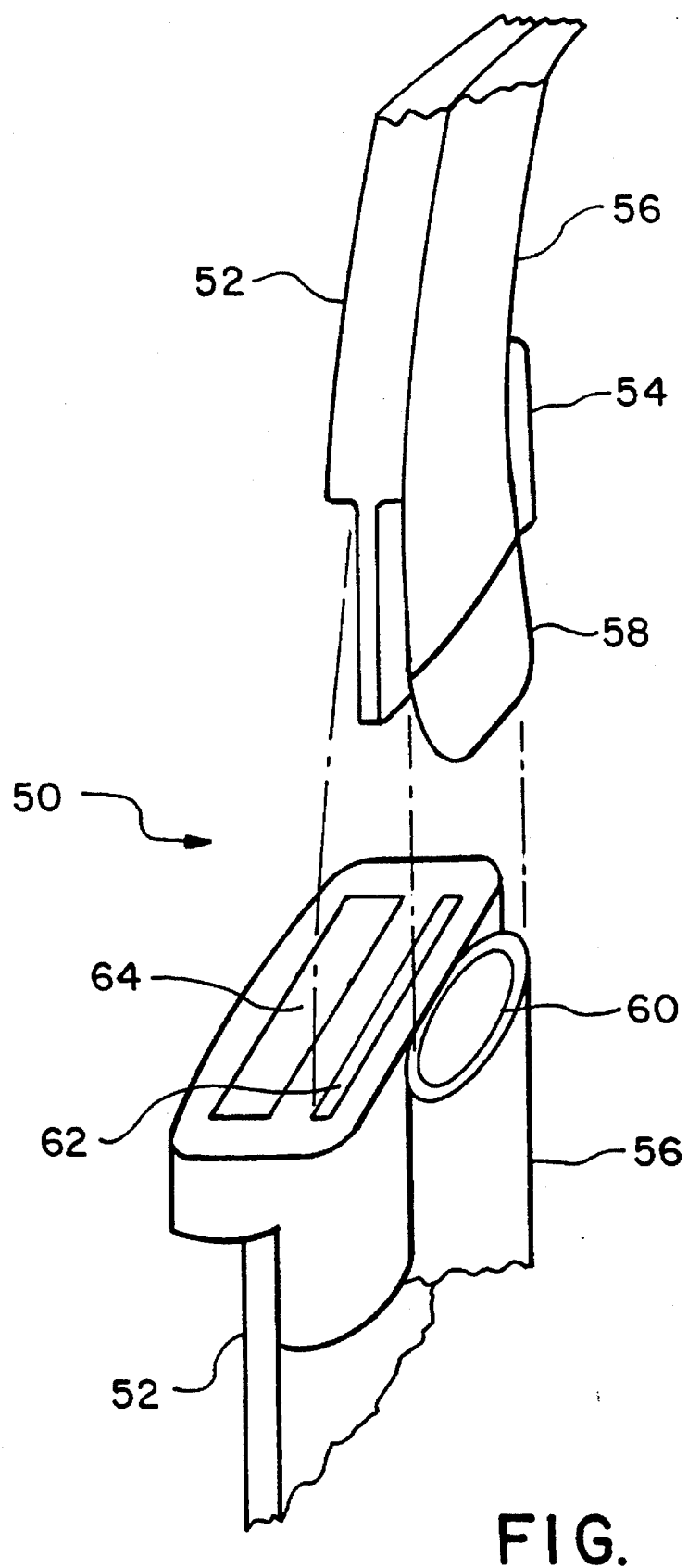
FIG. 7 is a perspective view of an embodiment of a seatbelt buckle according to the present invention.

FIG. 7 is a perspective view of a seatbelt buckle according to the present invention. Since gas flow means are to direct a gas from a remote gas generating means to the airbag site adjacent to the lap or the shoulder belt, the gas must travel to the airbag without interruption by a seatbelt buckle. One design for accomplishing this gas transport is the seatbelt buckle 50 of FIG. 7, which includes a seatbelt 52 having a metal flap 54 and a flap latch 62 with a release button 64. The gas flow means is a channel 56 which is coupled when the seatbelt is fastened by inserting the channel tip 58 into the channel receptacle 60 when metal flap 54 is inserted into latch 62. Channel tip 58 and channel receptacle 60 fit together in a press fit, and the seal is enhanced when the tip and the receptacle are constructed of a pliable polymeric material. It should be noted, that if the present seatbelt airbag is positioned on a passive restraint type seatbelt, which uses no buckles, a structure such as is shown in FIG. 7 is unnecessary.

It should be borne in mind that the present seatbelt airbag invention also encompasses the use of gas generating means in situ. In other words, gas generation may be effected at the point of inflation of the airbag, by suitable gas generating cartridges or chemical charges, without departing from the scope of the invention. An advantage of remote gas generation, however, is that the possibility of the vehicle occupant's sustaining burns from the gas generating means is reduced or eliminated. See for example FIG. 9, wherein the gas generator 96 is housed within the seat assembly and the seat thus protects the adjacent occupant from excessive gas ejection force and/or leaked chemicals.

Figure 9:
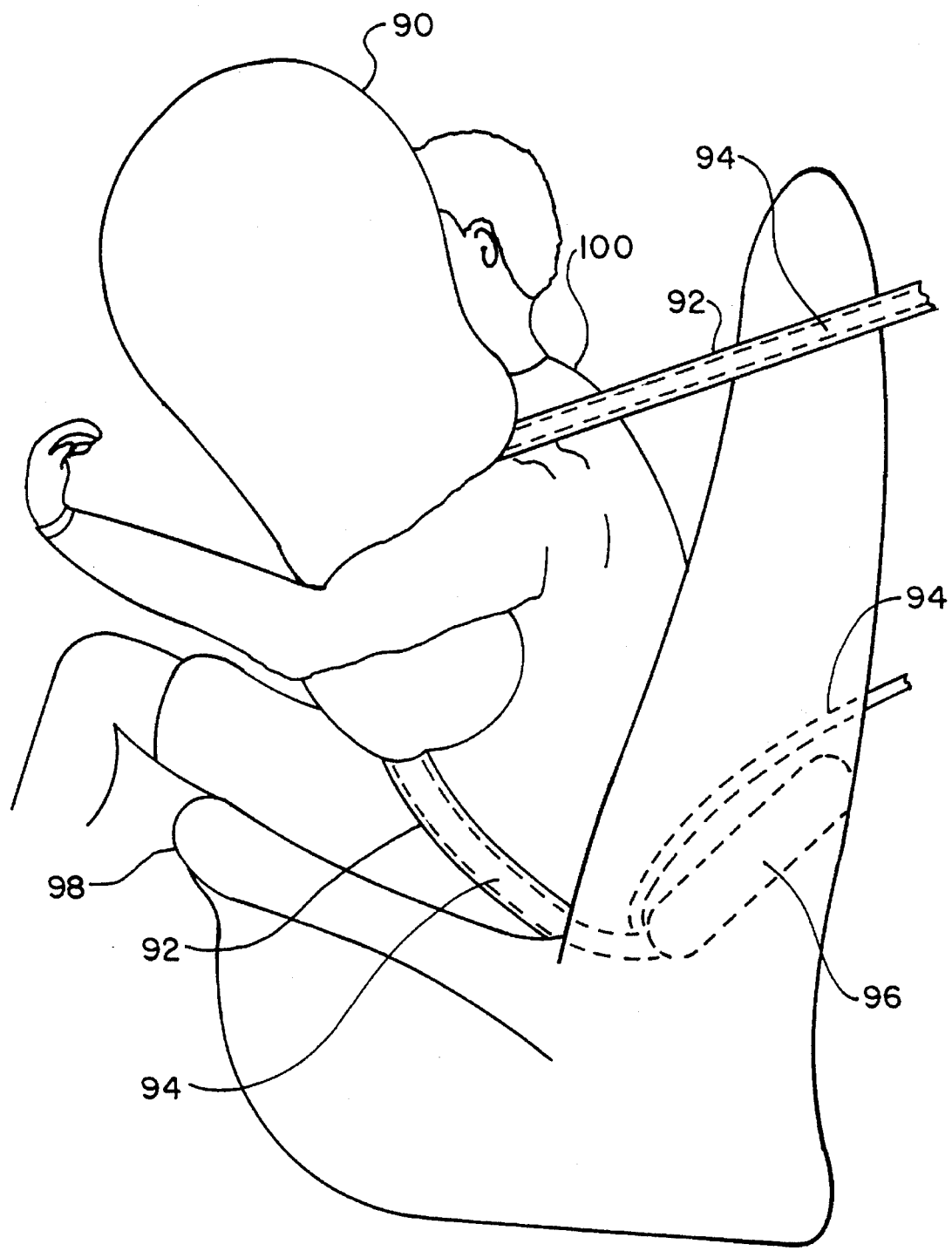
FIG. 9 is a perspective view of a deployed airbag according to the invention as it shields a vehicle occupant seated in a vehicle seat.

Referring further to FIG. 9 of the drawings, a vehicle driver 100 is shown seated in a vehicle seat 98, while wearing a seatbelt airbag according to the invention which has just deployed under vehicle crash conditions. The deployed airbag 90 is shown in front of and to the left of the driver, and the gas generator 96 is embedded in the vehicle seat 98. Gas channels 94 connect gas generator 96 to deployed airbag 90; much of their length is colinear with and contiguous to seatbelts 92.

Figure 8:
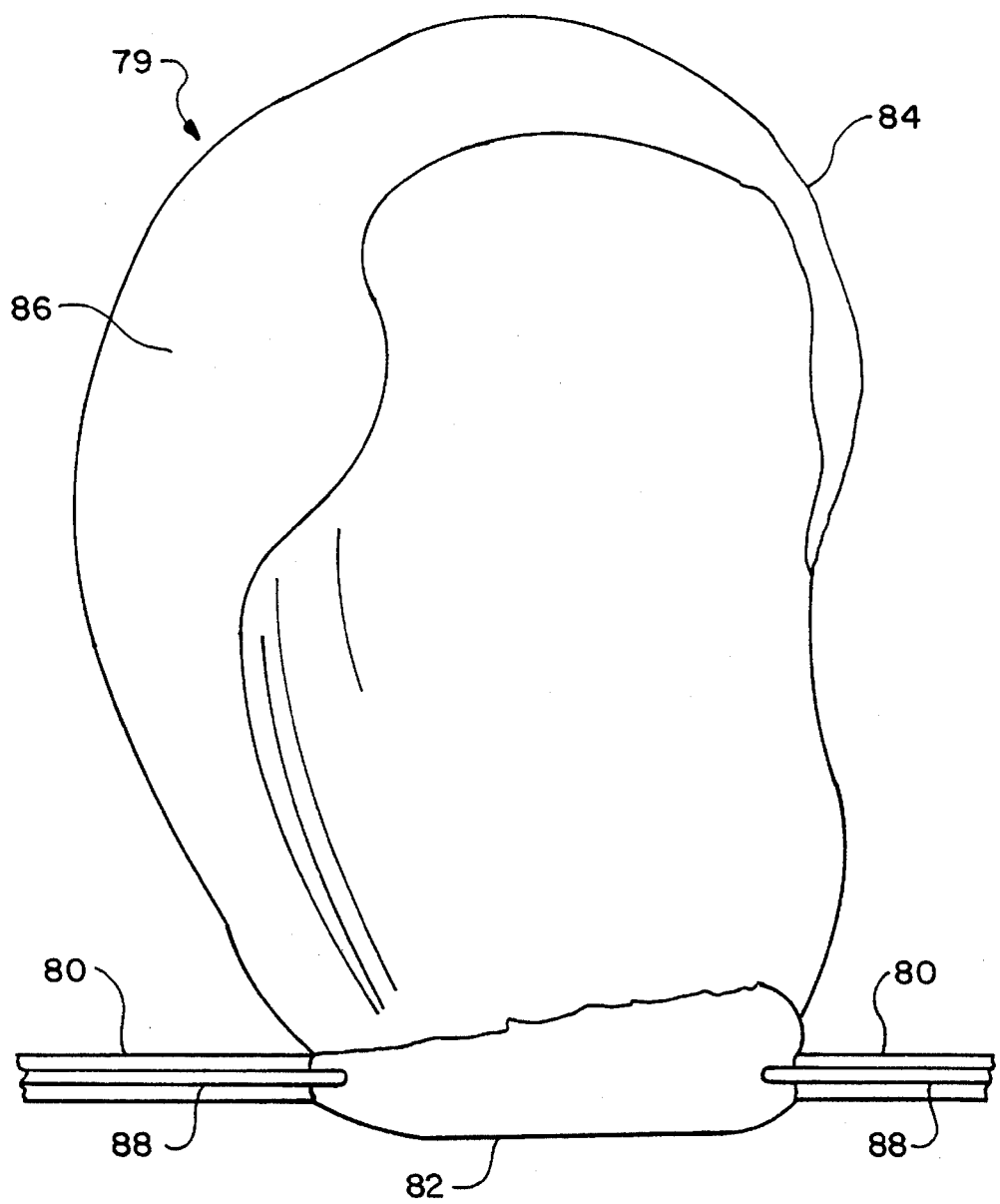
FIG. 8 is a perspective view of a deployed airbag according to the invention.

FIG. 8 is a perspective view of a seatbelt airbag 79 which has already undergone airbag deployment, in which a lap belt 80 holds the torn airbag pouch 82 from which the deployed airbag 84 has erupted. The lap belt 80 is colinear with the gas channel 88 which carried the gas which deployed the airbag. The deployed airbag 84 has a left-curving portion 86. The airbag is originally fabricated to take the shape as illustrated, so as to protect the front and left side of the wearer. The seatbelt airbag 79 of FIG. 8 is shown from the wearer's side and is intended for the driver's side in a United States vehicle—or for the rear left passenger. It cannot be overemphasized that mirror image designs are intended for the opposite side of a vehicle or for use in non-U.S. countries which observe opposite-side-of-road driving conventions.

Any materials suitable for use in known airbags and gas generators may be incorporated or adapted for use in the present invention. In fact, it is expected that as the state of the art of airbag materials and gas generation improves, such improvements will automatically be incorporated in the present designs without departing from the scope thereof.

As mentioned above, vehicles fitted with the present seatbelt airbags will bear the same crash or impact sensors as are known in the art, together with the necessary interconnections (communications systems) between the sensors and the gas generator(s) as are also known in the art. However, because the preferred embodiments of the present seatbelt airbags provide protection in front of and usually to one side of any vehicle occupant, it is likewise preferred that crash or impact sensors be provided at multiple locations at the front and the sides of the vehicle. Apart from this multiplied installation of sensors, however, it is intended that known impact sensor technology and transmitting systems therefor be used in the context of the present invention.

In operation, the present seatbelt airbag is much less likely to cause injury to the vehicle occupant than prior art airbags or seatbelts. With airbag deployment being immediately adjacent the seatbelt assembly, the airbag itself prevents the relative motion of the occupant versus the seatbelt and thus prevents contusions. Also, when the airbag inflates upwardly from the lap or the torso instead of directly toward the vehicle occupant, it tends to push eyeglasses and other hard objects up and away instead of toward the occupant. Finally, gas generation burns are less likely with the present design either because gas generation takes place from a remote location as illustrated in FIG. 9 or because the gas generated in the area of the lap or torso is less likely to cause burns than gas generated and propelled directly toward the head of a vehicle occupant.

The above description is not intended to be limiting, because innumerable variations on the present seatbelt airbag are possible without departing from the scope of the invention. For example, a single gas generating cartridge or charge can be incorporated in a vehicle seat and configured to inflate 2 or more airbags, possible by a single gas channel each. Also, the gas channel material may be selected from a wide variety of materials, as long as the material is strong enough to withstand the force of the gas. Therefore, the invention is intended to be limited only insofar as is set forth in the accompanying claims.

I claim:

1. A vehicle restraint system comprising: at least one airbag, means for mounting said airbag adjacent to a seatbelt of a vehicle, said airbag having inflation means connected thereto for inflating said airbag, said system further having a pouch surrounding said airbag, said pouch having openings for said seatbelt to be threaded therethrough and wherein said pouch has a first weakened area thereon, whereby inflation of said airbag ruptures said weakened area to permit said airbag to escape from said pouch, further wherein said pouch has an inclined surface and said weakened area is located in said inclined surface, and further wherein the surface of said pouch further includes a second weakened area, with said first and said second weakened areas being positioned on opposite sides of said pouch such that upon inflation said airbag simultaneously deploys through both said first and said second weakened areas.

2. The system of claim 1 wherein said seatbelt is a shoulder seatbelt.

3. The system of claim 1 wherein said seatbelt is a passive restraint seatbelt having no buckle thereon.

4. The system of claim 3 wherein said inflation means comprises a channel formed of a polymeric material.

\* \* \* \* \*